(12) United States Patent
Timbus et al.

(10) Patent No.: US 9,124,127 B2
(45) Date of Patent: Sep. 1, 2015

(54) DETECTING ISLANDING CONDITIONS IN POWER NETWORKS

(71) Applicant: ABB RESEARCH LTD, Zürich (CH)

(72) Inventors: Adrian Timbus, Baden-Dättwil (CH); Alexandre Oudalov, Fislisbach (CH); Mats Larsson, Baden-Dättwil (CH); Cherry Yuen, Baden (CH)

(73) Assignee: ABB RESEARCH LTD., Zurich (CH)

( * ) Notice: Subject to any disclaimer, the term of this patent is extended or adjusted under 35 U.S.C. 154(b) by 258 days.

(21) Appl. No.: 13/790,899

(22) Filed: Mar. 8, 2013

(65) Prior Publication Data

US 2013/0187454 A1    Jul. 25, 2013

Related U.S. Application Data

(63) Continuation of application No. PCT/EP2011/065539, filed on Sep. 8, 2011.

(60) Provisional application No. 61/381,312, filed on Sep. 9, 2010.

(51) Int. Cl.
*H02J 9/06* (2006.01)
*H02J 3/38* (2006.01)
*H02J 13/00* (2006.01)

(52) U.S. Cl.
CPC . *H02J 9/06* (2013.01); *H02J 3/381* (2013.01); *H02J 13/0006* (2013.01);
(Continued)

(58) Field of Classification Search
CPC .......................................................... H02J 9/06
See application file for complete search history.

(56) References Cited

U.S. PATENT DOCUMENTS

2010/0204948 A1   8/2010   Kirrmann et al.
2011/0031810 A1   2/2011   Bright

FOREIGN PATENT DOCUMENTS

WO    WO 2009/053309 A1    4/2009
WO    WO 2009/053668 A2    4/2009

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Mar. 21, 2013, issued in corresponding International Application No. PCT/EP2011/065539. (7 pages).
International Search Report (PCT/ISA/210) issued on Nov. 20, 2012, by the European Patent Office as the International Searching Authority for International Application No. PCT/EP2011/065539.
Written Opinion (PCT/ISA/237) issued on Nov. 20, 2012, by the European Patent Office as the International Searching Authority for International Application No. PCT/EP2011/065539.
Ma et al., "An agent brokering-based scheme for anti-islanding protection of distributed generation", Power & Energy Society General Meeting, IEEE, Jul. 2009, pp. 1-8.

(Continued)

*Primary Examiner* — Jared Fureman
*Assistant Examiner* — Terrence Willoughby
(74) *Attorney, Agent, or Firm* — Buchanan Ingersoll & Rooney PC

(57) ABSTRACT

A method is provided for detecting islanding conditions in an electric power network which includes a plurality of sub-networks. The sub-networks include at least one power electrical unit and are separable from each other and a main grid supplying the network by switching devices. The method includes determining topological information of at least one sub-network of interest, detecting islanding conditions in at least one sub-network of interest on the basis of the topological information by using separate detecting devices for each sub-network of interest, and sending, on the basis of the islanding conditions detected by using the detecting devices, a disconnect signal to at least one power electrical unit in at least one sub-network of interest.

14 Claims, 2 Drawing Sheets

(52) U.S. Cl.
CPC ....... *H02J 2003/388* (2013.01); *Y02B 70/3216* (2013.01); *Y02E 40/72* (2013.01); *Y02E 60/74* (2013.01); *Y04S 10/12* (2013.01); *Y04S 10/30* (2013.01); *Y04S 20/221* (2013.01); *Y10T 307/344* (2015.04)

(56) References Cited

OTHER PUBLICATIONS

Schweitzer et al., "Real-world synchrophasor solutions", Protective Relay Engineers, IEEE, Mar. 2009, pp. 536-547.

DETECTING ISLANDING CONDITIONS IN POWER NETWORKS

RELATED APPLICATIONS

This application claims priority as a continuation application under 35 U.S.C. §120 to PCT/EP2011/065539, which was filed as an International Application on Sep. 8, 2011 designating the U.S., and which claims priority to U.S. Provisional Application 61/381,312 filed in the United States on Sep. 9, 2010. The entire contents of these applications are hereby incorporated by reference in their entireties.

FIELD

The present disclosure relates to energy distribution, and more particularly to detecting islanding conditions in an electrical network.

BACKGROUND INFORMATION

Distributed generation (DG) based on renewable energy resources has shown a significant growth facilitated by policy makers, global concerns about climate change, availability of affordable energy shortage technologies, interest in clean energy production, etc. Energy suppliers using power plants based on fossil fuel (e.g., coal, natural gas, etc.) are also investing in an extension of energy generation portfolio by renewable alternatives such as wind turbines and photovoltaic systems.

However, there can be several requirements to be met before such systems can be connected to the utility grid. These requirements are generally published by standardizing institutions, such as IEC and IEEE, but also by local regulating authorities. One of the requirements, mandatory in many parts of the world, is that distributed generators, especially those connected to low voltage distribution grids, should be able to detect islanding conditions.

Islanding refers to a condition of a distributed generator, where the generator continues powering a part of a distribution network even though power from an electric utility is no longer present. FIGS. 1a and 1b show a difference between a grid-connected mode and an islanding mode.

In FIG. 1a, a switching device 1, for example, a circuit breaker or fuse, is closed, and distributed generators operate in grid-connected mode.

In FIG. 1b, the switching device 1 is opened and the lower part 2 of the network is no longer connected to the main grid. If the power generated by the distributed generators closely matches the power required by the load, the network can continue operation in the islanding mode. If the powers do not match closely, under/over voltage and under/over frequency relays of the distributed generators may stop the power generation. Therefore, the probability of having islanding conditions can be very small.

However, unintentional islanding can be dangerous to utility workers, who cannot realize that the particular part of the network on which they are working is still powered even though there is no power from the main grid. Also, islanding can lead to damages to customer equipment, especially in situations of re-closing into an island. For these reasons, distributed generators should be able to detect islanding and immediately stop power production.

There has been a lot of interest in micro-grids, such as distribution grids that can operate in controllable, intentional islanding conditions, decoupled from the main grid. In such grids, islanding detection can also be an important issue.

Detection of islanding conditions can be required in order to switch the control modes of distributed generators from power injection to voltage and frequency control during disconnection and vice versa during reconnection to the main grid.

The need for reliable islanding detection combined with development of distributed power generation industry has led to an intensive research and development of methods for identification of islanding conditions. These methods can be categorized in three main groups: passive, active, and communication-based methods.

Passive methods monitor one or more grid variables and, on the basis of deviation of the variables from allowed thresholds, a decision of disconnecting (detection of islanding) can be made. A passive method can look for an abnormal change in, for instance, frequency, voltage or phase angle but also in some particular harmonics or the total harmonic distortion (THD). If the monitoring algorithm detects large or sudden changes of these variables, the method can determine islanding conditions to be present. The islanding conditions can be determined on the basis of a combination of passive methods and multi-criteria decision making.

Passive methods can, for instance, be implemented by an algorithm within the controller of a distributed generator or in a dedicated external device. Passive methods are easy to implement and are quite effective in majority of situations that can occur in the grid.

However, non-detection zones (NDZ) of the passive methods are quite large. In situations where the power absorbed by the load closely matches the power generated by a distributed generator, the variations in voltage, frequency or phase angle can be lower than those specified in the standard because the network remains balanced even though the connection with the main grid has been lost. In such a case, the distributed generator cannot trip when an island has been formed. Passive methods are generally considered as an insufficient means for anti-islanding protection.

Active methods appeared as result of a need to minimize the non-detection zone of islanding detection methods. Active methods deliberately disturb the grid and, on the basis of the grid response to that disturbance (variation of grid electrical quantities), decide whether or not islanding has occurred.

For instance, disturbances in terms of shifts from normal operating values to grid voltage magnitude, frequency, or phase angle can be added by a distributed generator and, in case of grid connected situation, these disturbances should be corrected by the grid through the voltage and frequency control.

However, if a voltage magnitude, frequency or phase angle follow the shift introduced by the distributed generator, it can be determined that the grid has been disconnected, hence an island has been formed.

An active method can, for instance, be implemented using a positive feedback in a controller of a distributed generator. The controller tries to alter grid variables, such as frequency, phase, or voltage magnitude, in order to obtain, for instance, a frequency jump or phase jump, or a frequency bias. If the grid follows the changes generated by the distributed generator, the grid voltage will exceed imposed operating ranges and result in detection of islanding conditions. For instance, if the grid frequency follows the inverter current, an island has formed and the distributed generator should disconnect. Alternatively, a positive voltage feedback altering voltage magnitude at the point of common coupling can also be formed.

Alternatively, non-characteristic harmonics can be injected by the distributed generator and the grid response can be registered. Injection of non-characteristic inter-harmonic current can be used to derive the grid impedance at that particular frequency.

Impedance detection can be used as another active method approach. This approach is promoted by the requirements in the German standard. A current spike can, for instance, be periodically injected at the point of common coupling by a grid tied power converter. The grid impedance value is determined using Fourier transform, on the basis of the voltage response to this disturbance. A phase angle signal used to generate the reference for current controller can also be slightly altered to be able to estimate the grid impedance on the basis of a grid reaction to the generated current. A high frequency signal can also be injected at a zero crossing in order to determine the value of grid impedance, and active and reactive power oscillations can be used in to identify the value of grid impedance.

Although active methods can result in a more reliable islanding identification, they can also distort the delivered power by detecting the islanding conditions. Power system disturbance can be at an unacceptable level when more than one distributed generators are connected on a same feeder.

Because synchronization in respect to the inter-harmonic injection is possible, each distributed generator can inject a unique inter-harmonic in order to enable connection of more than one similar generation units on the same grid. However, only a finite number of distributed generators can be connected on the same feeder. The number of distributed generators directly depends on the standard demands regarding disconnection time and the number of injections necessary to obtain accurate impedance identification.

Large number of distributed generators using active methods can not only decrease the quality of power in the grid but also increase the non-detection zone of all active methods.

Communication-based methods make use of a communication means (owned, for instance, by a distribution system operator) which signalizes operational states of the switching equipment to the distributed generators.

A power line can be used as a carrier for communication between, for instance, a distributed generator and a utility grid. A continuous signal is transmitted by utility network via the power line. A receiver can be placed inside the distributed generator in order to detect a loss of this signal and, hence, islanding.

When a utility re-closer is equipped with a transmitter which communicates with DG when opens, a signal can, alternatively, be produced on disconnect.

Yet another approach is a SCADA (Supervisory Control And Data Acquisition) based method. For instance, voltage sensors can be placed at the location where a distributed generator is connected and those sensors can be integrated in the SCADA system. The SCADA system can then monitor for islanding conditions and alarm the distributed generators to disconnect in case of islanding.

A disadvantage of the communication based methods is that they typically require involvement from utility providers in implementation of islanding detection schemes, thus, making the methods less favorable for practical implementation. Because implementing communication also adds costs to both the distributed generator and the grid infrastructure, these methods are not commonly used today.

Another disadvantage of a SCADA based approach can be a relatively slow response time. For example, a response time for a SCADA system is around 5 to 10 seconds in an event of islanding conditions. This is far behind the typically requested disconnection time imposed by regulations, for example, 2 seconds.

Known electrical power network systems can have difficulties coping with increasing demand for power and need to reduce carbon dioxide emissions. Therefore, a new form of electrical power network systems that can handle these challenges in a sustainable, reliable and economic way is emerging. These networks can, for instance, utilize the same basic electric infrastructure as today, but will also draw on advanced monitoring, control and communications technology.

The result, for instance, can be a smart grid that is largely automated, applying greater intelligence to operate, monitor and even heal itself. The smart grid can be more flexible, more reliable and better able to serve the needs of a digital economy.

The availability of bidirectional communication in smart grid infrastructures combined with the power quality issues brought by active methods, especially when a large number of distributed generators are installed in the grid, can favor the communication based methods for islanding detection.

On the other hand, implementation of communication based methods can depend on cooperation with utility providers. The utility providers can be unwilling to adopt a centralized protection scheme as it could require significant investments from their part.

Additionally, in a smart grid, power can have more than one path to flow on, and the direction of the power can change. This can have a negative influence on the communication based methods listed above. For instance, if power lines are used as carriers for signals, multiple paths for power can cause signals to interfere and cause nuisance tripping of some of the distributed generators. The signals can be set with different frequencies but it can be necessary to ensure that all of the distributed generators located on the feeder listen to all of the used frequencies.

Multiple paths for power can also have an effect on methods where a signal is produced on disconnect. In a known radial network, once a switching device opens, it can send out a trip signal to all generators in the network. However, when multiple flow paths exist, the islanding conditions can depend on the direction of power in the paths. The switch can have to send out the trip signal in either direction. This can cause undesired disconnection of generators from a properly working part of the network.

FIG. 2 illustrates an example of a situation where a network of power electrical units is supplied by a main grid through two substations 1 and 2. The substations 1 and 2 are interconnected through switches 5 and 6.

If switch 3 of the first substation 1 is open and switch 4 of the second substation 4 is closed, power is supplied to the power electrical units from the second substation 4 and the local generators in the network. When switch 5 opens, it should send a trip signal only to generators located in the direction of first substation 1.

However, if the switch 4 of the first substation 1 and the switch 6 are closed and a switch 4 of the second substation 2 is open, switch 5 should send a trip signal only to generators located in the direction of the second substation 2 at disconnect. Thus, it can be very difficult for switch 5 to decide to which generators to send the trip signal.

In smart grids, a much higher sampling rate can be necessary in order for a SCADA approach to become efficient and compliant with the standards. Large sizes of distribution networks can require more space in the SCADA database and faster data processing. Moreover, due to large number of customers of Distribution System Operators, data sent to SCADA system is generally aggregated at a secondary substation level. Thus, concrete information about a particular customer, for instance, a distributed generator, can be nonexistent. The situation can change with the installation of smart meters all over the distribution grid. However, the installation of smart meters can challenge the communication bandwidth and speed and data storage if all data is stored at control centre level.

SUMMARY

An exemplary embodiment of the present disclosure provides an automation and control system for detecting islands in an electric power network. The exemplary automation control system includes a substation control device located at a substation of the network, and a communication system connecting the substation control device to switching devices, and to Distributed Generation (DG) units of the network. An island includes loads and DG units that are mutually interconnected on a same voltage level of the network and disconnected from a main grid supplying power to the network. The substation control device is configured to: receive topological information on behalf of a sub-network of the network; identify, from the topological information, an island within the sub network; and send signals to all the DG units of the identified island. The signals cause at least one of disconnection of the DG units of the identified island and changing of a control mode of the DG units of the identified island from power injection to voltage and frequency control.

An exemplary embodiment of the present disclosure provides a method for detecting islanding conditions in an electric power network including a plurality of sub-networks. The sub-networks include at least one power electrical unit and are separable, by means of switching devices, from each other and from a main grid supplying power to the network. The exemplary method includes determining topological information of at least one sub-network of interest, and detecting islanding conditions in at least one sub-network of interest on the basis of the determined topological information by using separate detecting devices for each sub-network of interest. In addition, the exemplary method includes sending, on the basis of the islanding conditions detected by using the detecting devices, a signal to at least one power electrical unit in at least one sub-network of interest, where the signal at least one of causes disconnection of the power electrical unit from the power network, and causes a change of a control mode of the power electrical unit from power injection to voltage and frequency control.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1A:
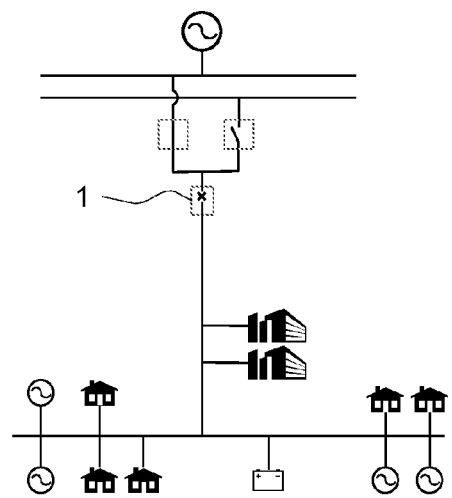
FIGS. 1a and 1b illustrate a difference between a grid-connected mode and an islanding mode.
Figure 1B:
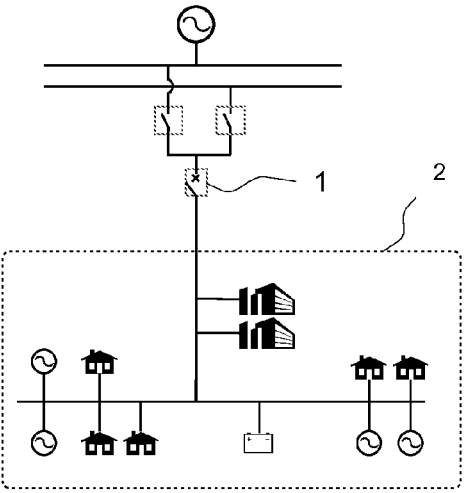
Figure 2:
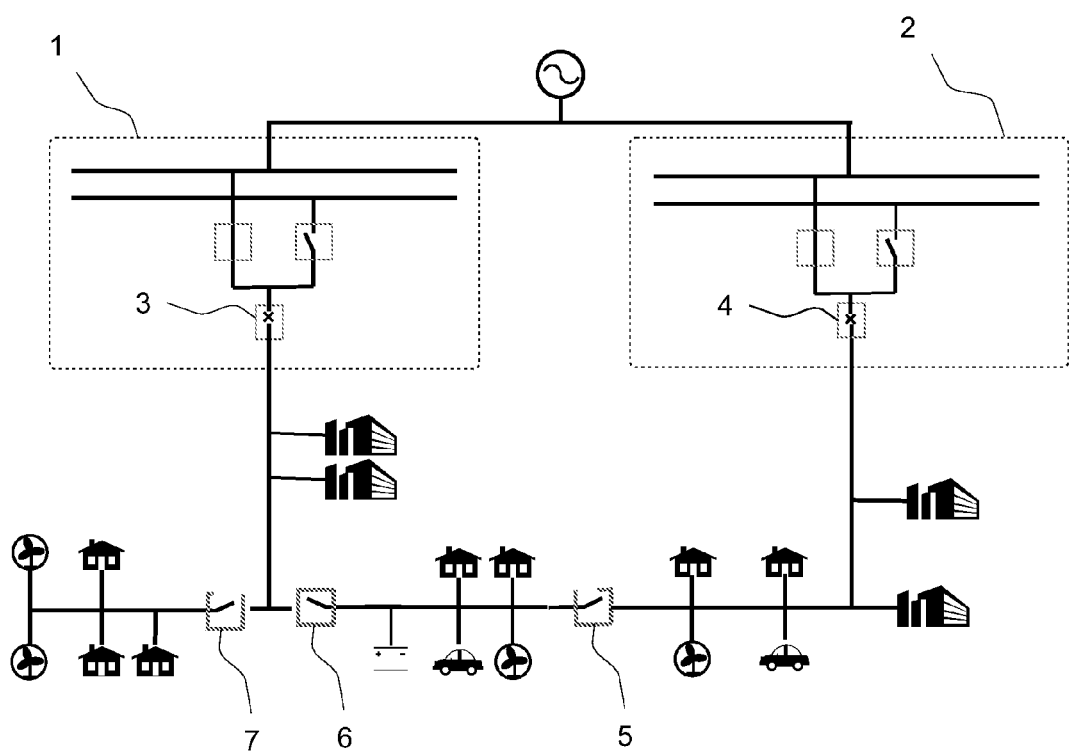
FIG. 2 illustrates an example of a situation where two substations are interconnected through switches.

Exemplary embodiments of the present disclosure alleviate the above-described disadvantages. Exemplary embodiments of the present disclosure provide an automation and control system as well as a method which detect islanding conditions in an electric power network, as described herein.

An exemplary embodiment of the present disclosure provides a method for detecting islanding conditions in an electric power network supplied by a main grid. The electrical power network is divided into a plurality of sub-networks, wherein the sub-networks include at least one power electrical unit. The sub-networks are separable from each other and from a main grid supplying the network by switching devices.

Islanding conditions within some or all of the sub-networks can be determined in a decentralized manner. Topological information of the sub-networks can first be determined. Islanding conditions in the sub-networks can then be determined on the basis of the topological information. Separate detecting means can be used for each sub-network. Finally, a signal resulting in disconnection or control mode change can be sent to the power electrical units of an island in the sub-network, on the basis of the islanding conditions determined by using the detecting means.

Power electrical units located in between neighboring switching devices can form anti-islanding groups (AIG). The power electrical units of an AIG can share disconnect or mode-change signals from the islanding condition detecting means, which reduces the response time following detection of islanding conditions.

A decentralized approach in detecting islanding conditions can reduce response time since it reduces complexity in topology used in detecting islanding conditions. Detecting means assigned to a small part of the network can operate in almost real time, thus, meeting the requirements for disconnecting within approximately two seconds as imposed by known standards.

The method of the present disclosure fits well to a smart grid. A smart grid may use a communication infrastructure, such as for metering, feeder automation, etc., which can be utilized in detecting islanding conditions. The method of the present disclosure can be implemented without significant investments in communications infrastructure. Thus, the method of the present disclosure can be cost competitive with the active methods without their weaknesses.

An exemplary embodiment of the present disclosure provides an automation and control system of a low or medium voltage electric power network. The automation and control system includes a communication system connecting a substation control device located at, or assigned to, a substation of the network to switching devices and to Distributed Generation (DG) units, for example, photovoltaic panels, wind turbines, or charged batteries, of the network. The automation and control system detects islands in the power network, where an island includes loads and DG units that are mutually interconnected on a same voltage level of the power network and disconnected from a main grid supplying the power network via the substation. The substation control device is configured to receive topological information, such as a dynamic switch status of switching devices in downstream feeders and inter-substation connection lines, on behalf of a sub-network of the power network, identify, from the topological information, an island within the sub network, and send signals to all the DG units of the identified island, independently of whether an individual DG is connected or not. In accordance with an exemplary embodiment, the sent signals can disconnect the DG unit and/or change a control mode of the DG units from power injection to voltage and frequency control in case the identified island is permitted.

The automation and control system is further configured to receive the topological information from the switching devices, to identify the island, and to send the signals to the DG units such that the latter are received within a delay of less than two seconds following an initiating open/close action of a switching device.

In the exemplary automation and control system, DG units located in between two or more neighboring switching devices form Anti Islanding Groups (AIG) as the atomic building blocks of all conceivable islands. The substation control device is configured to send a single signal to the AIG on behalf of all its constituting DG units.

An exemplary embodiment of the present disclosure provides a method for detecting islanding conditions in an electric power network, wherein the electrical power network includes a plurality of sub-networks. The sub-networks are separable from each other and from a main grid supplying the network by switching devices. Each sub-network includes at least one power electrical unit. A power electrical unit can, for instance, be a distributed generation unit (DG) such as a photovoltaic panel, a wind turbine, or an energy storage device such as a battery. The sub-networks can, for instance, be a low voltage (LV) grid supplied by the main grid via a substation, with the main grid being a medium voltage (MV) grid and the substation including a MV/LV transformer. Alternatively, the sub-networks can be at a medium voltage level above 10 kV, with the connected DG units including suitable step-up transformers.

The exemplary method includes determining topological information for at least one sub-network of interest. Determining the topological information can, for instance, be performed by determining an operational state of at least one switching device. Further, the topological information can disclose details of the structure of the electrical network and/or sub-network in question. This structure can, for instance, be represented by a truth table. The truth table can tell which combinations of switching device operational states produce islanding conditions within the particular sub-network.

When the topological information is known, islanding conditions in the at least one sub-network of interest are detected on the basis of the topological information by using separate detecting means for each sub-network of interest. In other words, islanding conditions of each sub-network of interest are calculated locally, independently from each other. Islanding conditions of some or all of the sub-networks can be determined in a decentralized manner. Because the method is localized to only a part of the network, it can operate practically in real time, thus meeting the requirements for disconnect imposed by standards. Thus, determining the islanding conditions can be performed within two seconds from a topology change, as regulated in known standards.

The detecting means can, for instance, be implemented on network substation computers. The substation computers can, for instance, be provided with the network topology from an upper level, such as a distribution control center. The network substation computers can then monitor the status of the switching device along the feeder and the interconnecting lines with the neighbouring substations and, on a disconnect signal from a switching device, perform logical operations for deciding to which distributed generators it shall send a disconnect signal in case of islanding.

The substation computers can have also other functions such as, for example, feeder reconfiguration, restoration, protection and control, optimization of energy use, etc. Furthermore, in a smart grid, the disclosed method can be able to use the communication infrastructure deployed in the smart grid for functions such as metering, feeder automation, etc. Thus, the cost of implementing the disclosed method can be reduced.

The substation computers are just one example of the detecting means. Any means capable of calculating the islanding conditions for a sub-network on the basis of the topological information can be used. It is to be understood that the substation computers, as an example of the detecting means, respectively include one or more processors configured to execute an appropriate software program tangibly recorded on a non-transitory computer-readable recording medium (e.g., a non-volatile memory) for carrying out the operative functions of the detecting means as described herein.

Finally, a disconnect signal can be sent sending to at least one power electrical unit in at least one sub-network of interest on the basis of the islanding conditions determined by using the detecting means. On the basis of the signal, the power electrical unit disconnects from the network.

The power electrical units can form anti-islanding groups (AIG). In other words, at least one sub-network of interest includes at least two power electrical units interconnected on the same LV level forming an anti-islanding group. The same disconnect signal is sent to all electrical units in the anti-islanding group when islanding conditions are detected.

These groups can, for instance, include all distributed generators located between two consecutive switching devices in case of radial feeders. In case of a meshed grid with multiple paths for power, an AIG could be defined between two or more switches with a direct connection, for example, without any further subdividing switch. A goal of an anti-islanding group is to speed up the processing time in detecting islanding. For instance, once a part of the feeder is disconnected due to opening of switches, a group of distributed generators connected to that part of the network (modelled as one AIG) can receive a common disconnect signal from a substation computer.

Figure 3:
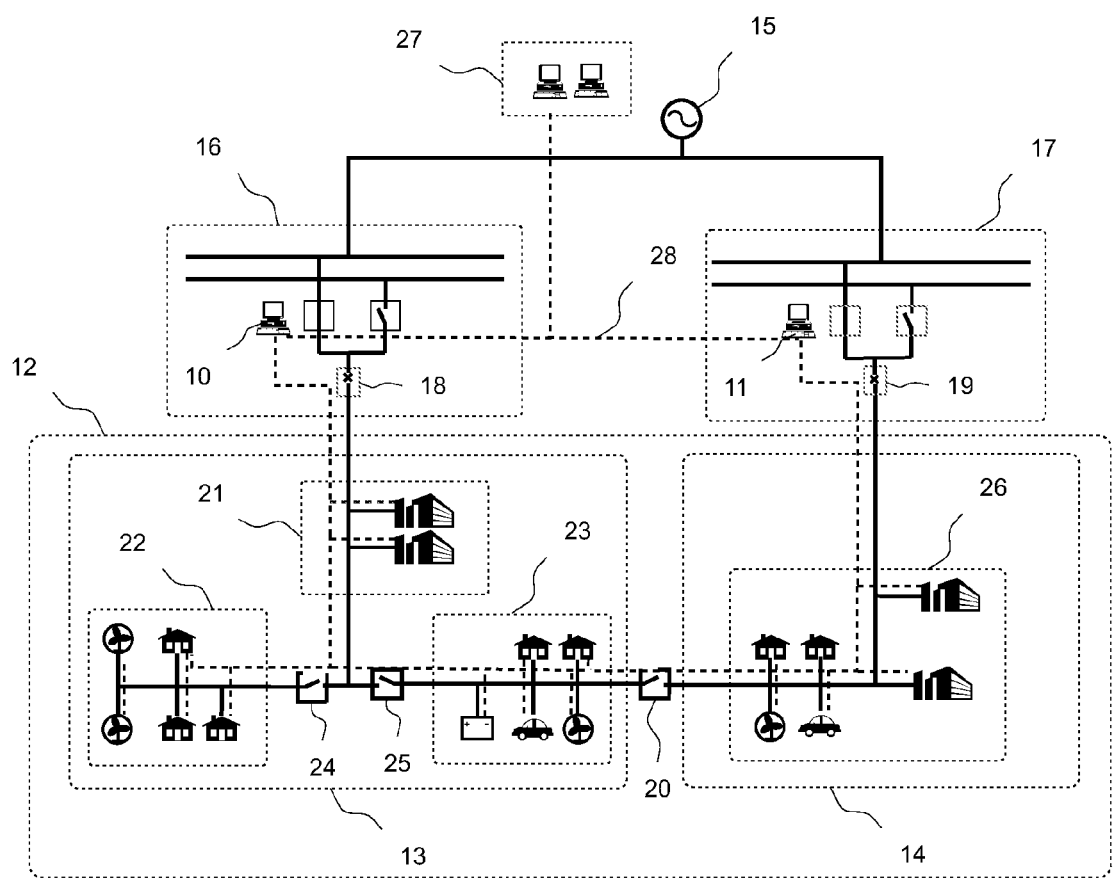
FIG. 3 illustrates an exemplary arrangement of the present disclosure which includes apparatuses for detecting islanding conditions in an electric power network.

FIG. 3 illustrates an exemplary embodiment of an arrangement including apparatuses 10 and 11 for detecting islanding conditions in an electric power network 12. The network 12 can, for instance, be a low voltage (LV) network, although it is to be understood that the present disclosure is not limited thereto. In FIG. 3, network 12 includes two sub-networks 13 and 14. The sub-networks 13 and 14 are supplied by the main grid 15 via substations 16 and 17. The main grid can, for instance, be a medium voltage (MV) grid, and the substations 16 and 17 can include MV/LV transformers. The amount of sub-networks is not limited to two. The exemplary network 12 can include any plurality of sub-networks. A communication system 28 with a communication network (broken line) enables the exchange of messages between the apparatuses 10, 11 and devices of the sub-networks.

The sub-networks 13 and 14 are separable from each other and from the main grid 15 supplying the network by switching devices 18, 19, and 20. The sub-networks 13 and 14 can each include at least one power electrical unit. A power electrical unit can, for instance, be a load or a distributed generator. In FIG. 3, the power electrical units are mutually interconnected on the same LV level.

In FIG. 3, the sub-networks 13 and 14 can be further divided into groups separable by switching devices. The first sub-network 13 is divided into three groups 21, 22, and 23 separable by switching devices 24 and 25. The second sub-network 14 includes group 26.

An exemplary apparatus according to the present disclosure includes means for determining the topological information of at least one sub-network of interest. In FIG. 3, the means for determining the topological information are implemented in substation computers 10 and 11. The substation computers are part of the substations 16 and 17, respectively.

The substation computers 10 and 11 can, for instance, receive information on the network structure from an upper level, for example, a distribution control centre 27. Further, the substation computers 10 and 11 receive information of the operational status of the switching devices of part of the electrical power network 12. The substation computers 10 and 11 can have also other functions relating to the network 12.

A required maximum response time can impose some limits on the size of the network as islanding conditions should typically be detected within two seconds of a topology change. Therefore, a decentralized approach allows reduction in response time. An apparatus according to the present disclosure includes separate detecting means for each sub-network of interest to determine islanding conditions in the sub-networks of interest on the basis of the topological information. Detecting islanding conditions of each sub-network of interest is localized to a small part of the network. Thus, the detecting means can operate practically in real time meeting the requirements of the standards. The substation computers 10 and 11, as examples of the detecting means, respectively include one or more processors configured to execute an appropriate software program tangibly recorded on a non-transitory computer-readable recording medium (e.g., a non-volatile memory) for carrying out the operative functions of the detecting means as described herein.

In FIG. 3, the substation computers 10 and 11 operate as the detecting means and perform the logical operations for deciding to which power electronic units they shall send the disconnect signal in case of islanding. The topological information can, for instance, be represented by a truth table. Table 1 illustrates an exemplary truth table for islanding conditions of power electrical units in group 23. In Table 1, the islanding conditions are determined on the basis of operational status of switches 18, 19, 20, and 25. '1' represents a closed switch and '0' represents an open switch. The switch 24 does not have an effect on the islanding conditions of the group 23.

TABLE 1

| Switch 18 | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|
| Switch 19 | 0 | 0 | 0 | 0 | 1 | 1 | 1 | 1 | 0 | 0 | 0 | 0 | 1 | 1 | 1 | 1 |
| Switch 20 | 0 | 0 | 1 | 1 | 0 | 0 | 1 | 1 | 0 | 0 | 1 | 1 | 0 | 0 | 1 | 1 |
| Switch 25 | 0 | 1 | 0 | 1 | 0 | 1 | 0 | 1 | 0 | 1 | 0 | 1 | 0 | 1 | 0 | 1 |
| Islanding conditions | y | y | y | y | y | y | n | n | y | n | y | n | y | n | n | n |

In Table 1, islanding conditions can be detected correctly regardless of the direction of power in the power lines of the network 12.

To react to detected islanding conditions, an apparatus according to the present disclosure further includes means for sending, on the basis of the islanding conditions determined by using the detecting means, a disconnect signal to at least one power electrical unit in at least one sub-network of interest. In FIG. 3, the substation computers 10 and 11 send disconnect signals to the power electrical units and thus function as the means for sending in the example of FIG. 3.

Power electrical units interconnected on the same LV level can also form anti-islanding groups (AIG). In the case of radial feeders, these anti-islanding groups can, for instance, include all the distributed generators located between two consecutive switching devices. In the case of a grid with multiple paths for power, an AIG can be defined between the switches with direct connection without the possibility of interrupting between any combination of two switches.

Once islanding conditions are detected, an anti-islanding group of electrical units receive a shared disconnect signal from the substation computer. In FIG. 3, groups 21, 22, 23 and 26 can, for instance, form anti-islanding groups. A saving in processing time can be achieved due to the fact that distributed generators are structured in groups. A shared disconnect signal can be sent to all electrical units in the anti-islanding group. The electrical units of the group can receive the signal regardless of whether an individual electrical unit is actually connected or not.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An automation and control system for detecting islands in an electric power network, comprising:

a substation control device located at a substation of the network; and a communication system connecting the substation control device to switching devices and to Distributed Generation (DG) units of the network, wherein:

an island includes loads and DG units that are mutually interconnected on a same voltage level of the network and disconnected from a main grid supplying power to the network; and the substation control device is configured to:

receive topological information on behalf of a sub-network of the network;

identify, from the topological information, an island within the sub network; and send signals to at least one of the DG units of the identified island, the signals causing at least one of disconnection of the DG units of the identified island and changing of a control mode of the DG units of the identified island from power injection to voltage and frequency control, wherein the substation control device is configured to receive the topological information, identify the island, and send the signals to the at least one of the DG units within a delay of less than two seconds following at least one of an open and a close of a switching device.

2. The automation and control system according to claim 1, wherein:

the DG units located in between neighboring switching devices form an Anti Islanding Group (AIG); and the substation control device is configured to send a signal to the AIG on behalf of each DG unit of the AIG.

3. The automation and control system according to claim 1, wherein:

the sub-networks are low voltage (LV) electric power networks; and the main grid is a medium voltage (MV) grid.

4. The automation and control system according to claim 1, wherein the electric power network is a low or medium voltage electric power network.

5. A method for detecting islanding conditions in an electric power network including a plurality of sub-networks, the sub-networks including at least one power electrical unit and being separable from each other and the main grid, the method comprising:
- determining topological information of at least one sub-network of interest;
- detecting islanding conditions in at least one sub-network of interest on the basis of the determined topological information by using separate detecting devices for each sub-network of interest; and
- sending, on the basis of the islanding conditions detected by using the detecting devices, a signal to at least one power electrical unit in at least one sub-network of interest, the signal at least one of causing disconnection of the power electrical unit from the power network, and causing a change of a control mode of the power electrical unit from power injection to voltage and frequency control, wherein:
- at least one sub-network of interest includes at least two power electrical units interconnected on the same low or medium voltage level and forming an anti-islanding group; and
- the sending of the disconnect signal includes sending the disconnect signal to all electrical units in the anti-islanding group.

6. The method according to claim 5, wherein the determining of the topological information comprises:
- determining an operational state of at least one switching device.

7. The method according to claim 5, wherein at least one sub-network is supplied by the main grid via a substation.

8. The method according to claim 5, wherein:
- the sub-networks are a low voltage (LV) electric power network;
- the main grid is a medium voltage (MV) grid; and
- at least one sub-network is supplied by the main grid via a substation including a MV/LV transformer.

9. The method according to claim 5, wherein the signal sent to the at least one power electrical unit is received within two seconds from a topology change.

10. The method according to claim 5, wherein the electric power network is a low or medium voltage electric power network.

11. A method for detecting islanding conditions in an electric power network,
- wherein the network includes a substation control device located at a substation of the network, and a communication system connecting the substation control device to switching devices and to Distributed Generation (DG) units of the network,
- wherein an island includes loads and DG units that are mutually interconnected on a same voltage level of the network and disconnected from a main grid supplying power to the network, and
- wherein the method comprises:
  - receiving, by the substation control device, topological information on behalf of a sub-network of the network;
  - identifying, by the substation control device, an island within the sub network from the topological information;
  - sending, by the substation control device, signals to at least one of the DG units of the identified island, the signals causing at least one of disconnection of the DG units of the identified island and changing of a control mode of the DG units of the identified island from power injection to voltage and frequency control,
- wherein the substation control device receives the topological information, identifies the island, and sends the signals to the at least one of the DG units within a delay of less than two seconds following at least one of an open and a close of a switching device.

12. The method according to claim 11, wherein:
- the DG units located in between neighboring switching devices form an Anti Islanding Group (AIG); and
- the substation control device sends a signal to the AIG on behalf of each DG unit of the AIG.

13. The method according to claim 11, wherein:
- the sub-networks are low voltage (LV) electric power networks; and
- the main grid is a medium voltage (MV) grid.

14. The method according to claim 11, wherein the electric power network is a low or medium voltage electric power network.

* * * * *